United States Patent
Morisaki

(10) Patent No.: US 8,942,877 B2
(45) Date of Patent: Jan. 27, 2015

(54) HYBRID VEHICLE AND METHOD FOR CONTROLLING THE SAME

(75) Inventor: Keisuke Morisaki, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 14/009,995

(22) PCT Filed: Apr. 7, 2011

(86) PCT No.: PCT/JP2011/058775
§ 371 (c)(1),
(2), (4) Date: Oct. 4, 2013

(87) PCT Pub. No.: WO2012/137329
PCT Pub. Date: Oct. 11, 2012

(65) Prior Publication Data
US 2014/0039744 A1   Feb. 6, 2014

(51) Int. Cl.
*B60W 20/00*   (2006.01)
*B60K 6/445*   (2007.10)
*B60W 10/06*   (2006.01)
*B60W 50/00*   (2006.01)

(52) U.S. Cl.
CPC ............... *B60W 20/40* (2013.01); *B60K 6/445* (2013.01); *B60W 10/06* (2013.01); *B60W 20/00* (2013.01); *B60W 20/106* (2013.01); *B60W 2510/244* (2013.01); *B60W 2050/0062* (2013.01); *B60W 2540/16* (2013.01); *Y02T 10/6239* (2013.01); *Y10S 903/903* (2013.01)
USPC ............................ 701/22; 180/65.28; 903/903

(58) Field of Classification Search
CPC ...... B60K 6/445; B60W 10/06; B60W 20/00; B60W 20/106; B60W 2510/244; B60W 2050/0062; B60W 2540/16; B60W 20/40; Y02T 10/6239; Y10S 903/903
USPC .......................... 701/22; 180/65.28; 903/903
See application file for complete search history.

(56) References Cited

U.S. PATENT DOCUMENTS 6,494,809 B1   12/2002   Suzuki et al.
2009/0198438 A1   8/2009   Jinno

FOREIGN PATENT DOCUMENTS

| JP | 2001-140673 A | 5/2001 | |
| JP | 2006-077641 A | 3/2006 | |
| JP | 2009018743 A * | 7/2007 | ............ B60K 6/445 |
| JP | 2008-008215 A | 1/2008 | |
| JP | 2009-018743 A | 1/2009 | |
| JP | 2010-174827 A | 8/2010 | |

* cited by examiner

Primary Examiner — Mary Cheung
Assistant Examiner — Brian P Sweeney
(74) Attorney, Agent, or Firm — Kenyon & Kenyon LLP

(57) ABSTRACT

A motor generator and a power converter are driven by an engine, to supply electric power to a power storage device. ECU causes the engine to start if SOC of the power storage device falls below a first threshold value, and causes the engine to stop if SOC exceeds a second threshold value which is larger than the first threshold value. In the case where a running range has been selected when the vehicle stops, ECU causes the engine to stop if SOC exceeds a third threshold value which is larger than the first threshold value and smaller than the second threshold value. In the case where a non-running range has been selected, ECU causes the engine to stop if SOC exceeds the second threshold value.

10 Claims, 6 Drawing Sheets

HYBRID VEHICLE AND METHOD FOR
CONTROLLING THE SAME

CROSS-REFERENCE TO RELATED APPLICATION

This is a national phase application based on the PCT International Patent Application No. PCT/JP2011/058775 filed on Apr. 7, 2011, the entire contents of which are incorporated herein by reference.

TECHNICAL FIELD

The present invention relates to a hybrid vehicle and a method for controlling the same, and more particularly to a hybrid vehicle having an internal combustion engine, a power storage device and a traction motor mounted thereon, as well as a method for controlling the same.

BACKGROUND ART

As an environmentally friendly vehicle, a hybrid vehicle having mounted thereon a traction motor that receives supply of electric power from a power storage device and an internal combustion engine, as sources of motive power.

Japanese Patent Laying-Open No. 2001-140673 (PTD 1) discloses an engine stop/start control device applicable to such a hybrid vehicle. This engine stop/start control device is employed in a vehicle in which the engine is stopped when a predetermined stop condition is met and the engine is started when a predetermined start condition is met. The engine stop/start control device includes means for detecting the shift position of the vehicle and means for, when the shift position is at a running position, changing the start condition to the side where the engine is unlikely to start as compared with the case of being at a non-running position.

It is supposed that this engine stop/start control device can minimize the number of times of starting the engine at the running position and reduce discomfort given to a driver (see PTD 1).

CITATION LIST

Patent Document

PTD 1: Japanese Patent Laying-Open No. 2001-140673
PTD 2: Japanese Patent Laying-Open No. 2010-174827
PTD 3: Japanese Patent Laying-Open No. 2009-18743
PTD 4: Japanese Patent Laying-Open No. 2006-77641
PTD 5: Japanese Patent Laying-Open No. 2008-8215

SUMMARY OF INVENTION

Technical Problem

When the charged state of the power storage device decreases, a hybrid vehicle generates electric power using the internal combustion engine, so that the power storage device is charged. For example, when a remaining capacity (hereinafter also referred to as "SOC" and presented percentagewise relative to a fully charged state, for example) of the power storage device falls below a predetermined first threshold value, the internal combustion engine is operated so that the power storage device is charged until SOC exceeds a second threshold value which is larger than the first threshold value. Even if the vehicle is at a stop, this charging will be executed if the charged state of the power storage device decreases.

In a hybrid vehicle, however, operation of the internal combustion engine during a vehicle stop may give discomfort to a user. In addition, charging during a vehicle stop is not desirable in terms of efficiency as well. Specifically, in general, the internal combustion engine operates with high efficiency at somewhat high power state. However, charging during a vehicle stop is not desirable in terms of efficiency because it is sufficient to operate the internal combustion engine in the low power state. It is therefore desirable that operation of the internal combustion engine be restrained during a vehicle stop while achieving recovery of the charged state of the power storage device if it decreases. The above-mentioned document, however, gives no specific consideration under what conditions the internal combustion engine should be stopped/started from a viewpoint of charged state.

On the other hand, even if the internal combustion engine could be restrained from operating during a vehicle stop, the user may feel discomfort when stop and operation of the internal combustion engine is repeated frequently during a vehicle stop. Consideration in this respect is required.

The present invention was therefore made to solve this problem, and has an object to, in a hybrid vehicle, relieve user's discomfort caused by operation of an internal combustion engine during a vehicle stop while achieving recovery of a charged state of a power storage device if the charged state decreases.

Solution to Problem

According to the present invention, a hybrid vehicle includes a power storage device, an internal combustion engine, at least one motor, a control device, and a shift selection device. The at least one motor has an electric power generation function in which the motor is driven by the internal combustion engine to supply electric power to the power storage device and a function of producing running driving force. The control device is configured to control start and stop of the internal combustion engine based on a start condition and a stop condition for the internal combustion engine set from a physical quantity relevant to a charged state of the power storage device. The shift selection device is for selection of one of a plurality of shift ranges included in one of a running range and a non-running range. In the case where the running range has been selected when the vehicle stops, the control device sets the start condition and the stop condition for the internal combustion engine such that an operation duration of the internal combustion engine is shorter than during vehicle running, and in the case where the non-running range has been selected, the control device sets the stop condition for the internal combustion engine such that the operation duration of the internal combustion engine is longer than in the case where the running range has been selected when the vehicle stops.

Preferably, in the case where the running range has been selected when the vehicle stops, the control device makes a change in the stop condition for the internal combustion engine such that the operation duration of the internal combustion engine is shorter than during vehicle running, and in the case where the non-running range has been selected, the control device stops the change in the stop condition for the internal combustion engine.

Preferably, the physical quantity is a remaining capacity of the power storage device. The control device causes the internal combustion engine to start if the remaining capacity falls below a first threshold value corresponding to the start condition for the internal combustion engine. In the case where the running range has been selected when the vehicle stops, the control device causes the internal combustion engine to stop if the remaining capacity exceeds a second threshold value corresponding to the stop condition for the internal combustion engine, which is larger than the first threshold value. In the case where the non-running range has been selected, the control device causes the internal combustion engine to stop if the remaining capacity exceeds a third threshold value which is larger than the second threshold value.

More preferably, in the case where the running range has been selected when the vehicle stops, the control device sets a vehicle operation mode at an economy running mode in which the internal combustion engine is stopped during a vehicle stop and is started as the vehicle starts running, if the remaining capacity exceeds the second threshold value. In the case where the non-running range has been selected, the control device cancels setting of the economy running mode.

Preferably, the physical quantity is a voltage of the power storage device. The control device causes the internal combustion engine to start if the voltage falls below a first threshold value corresponding to the start condition for the internal combustion engine. In the case where the running range has been selected when the vehicle stops, the control device causes the internal combustion engine to stop if the voltage exceeds a second threshold value corresponding to the stop condition for the internal combustion engine, which is larger than the first threshold value. In the case where the non-running range has been selected, the control device causes the internal combustion engine to stop if the voltage exceeds a third threshold value which is larger than the second threshold value.

Preferably, the physical quantity includes an elapsed time from the start of charging of the power storage device. After the internal combustion engine is started based on the start condition for the internal combustion engine, in the case where the running range has been selected when the vehicle stops, the control device causes the internal combustion engine to stop if the elapsed time exceeds a first threshold time corresponding to the stop condition for the internal combustion engine, and in the case where the non-running range has been selected, the control device causes the internal combustion engine to stop if the elapsed time exceeds a second threshold time which is longer than the first threshold time.

Further, according to the present invention, a method for controlling is a method for controlling a hybrid vehicle. The hybrid vehicle includes a power storage device, an internal combustion engine, at least one motor, and a shift selection device. The at least one motor has an electric power generation function in which the motor is driven by the internal combustion engine to supply electric power to the power storage device and a function of producing running driving force. The shift selection device is for selection of one of a plurality of shift ranges included in one of a running range and a non-running range. The method for controlling includes the steps of controlling start and stop of the internal combustion engine based on a start condition and a stop condition for the internal combustion engine set from a physical quantity relevant to a charged state of the power storage device, in the case where the running range has been selected when the vehicle stops, setting the start condition and the stop condition for the internal combustion engine such that an operation duration of the internal combustion engine is shorter than during vehicle running, and in the case where the non-running range has been selected, setting the stop condition for the internal combustion engine such that the operation duration of the internal combustion engine is longer than in the case where the running range has been selected when the vehicle stops.

Preferably, the step of setting the start condition and the stop condition for the internal combustion engine includes the step of, in the case where the running range has been selected when the vehicle stops, making a change in the stop condition for the internal combustion engine such that the operation duration of the internal combustion engine is shorter than during vehicle running. The step of setting the stop condition for the internal combustion engine such that the operation duration of the internal combustion engine is longer includes the step of, in the case where the non-running range has been selected, stopping the change in the stop condition for the internal combustion engine.

Preferably, the physical quantity is a remaining capacity of the power storage device. The step of controlling start and stop of the internal combustion engine includes the steps of starting the internal combustion engine if the remaining capacity falls below a first threshold value corresponding to the start condition for the internal combustion engine, in the case where the running range has been selected when the vehicle stops, stopping the internal combustion engine if the remaining capacity exceeds a second threshold value corresponding to the stop condition for the internal combustion engine, which is larger than the first threshold value, and in the case where the non-running range has been selected, stopping the internal combustion engine if the remaining capacity exceeds a third threshold value which is larger than the second threshold value.

More preferably, the method for controlling further includes the step of, in the case where the running range has been selected when the vehicle stops, setting a vehicle operation mode at an economy running mode in which the internal combustion engine is stopped during a vehicle stop and is started as the vehicle starts running, if the remaining capacity exceeds the second threshold value, and in the case where the non-running range has been selected, canceling setting of the economy running mode.

Advantageous Effects of Invention

In the present invention, in the case where the running range has been selected when the vehicle stops, the start condition and the stop condition for the internal combustion engine is set such that an operation duration of the internal combustion engine is shorter than during vehicle running. The internal combustion engine can thereby be restrained from operating during a vehicle stop while achieving recovery of a charged state of the power storage device if the charged state decreases. On the other hand, in the case where the non-running range has been selected, the stop condition for the internal combustion engine is set such that the operation duration of the internal combustion engine is longer than in the case where the running range has been selected when the vehicle stops. Accordingly, when the non-running range in which the time until running is started is likely to be longer has been selected, frequent stop and operation of the internal combustion engine that may be caused by setting the start condition and the stop condition for the internal combustion engine such that the operation duration of the internal combustion engine is shorter can be restrained. Therefore, according to the present invention, user's discomfort caused by operation of the internal combustion engine during a vehicle stop can be relieved while achieving recovery of the charged state.

DESCRIPTION OF EMBODIMENTS

Figure 1:
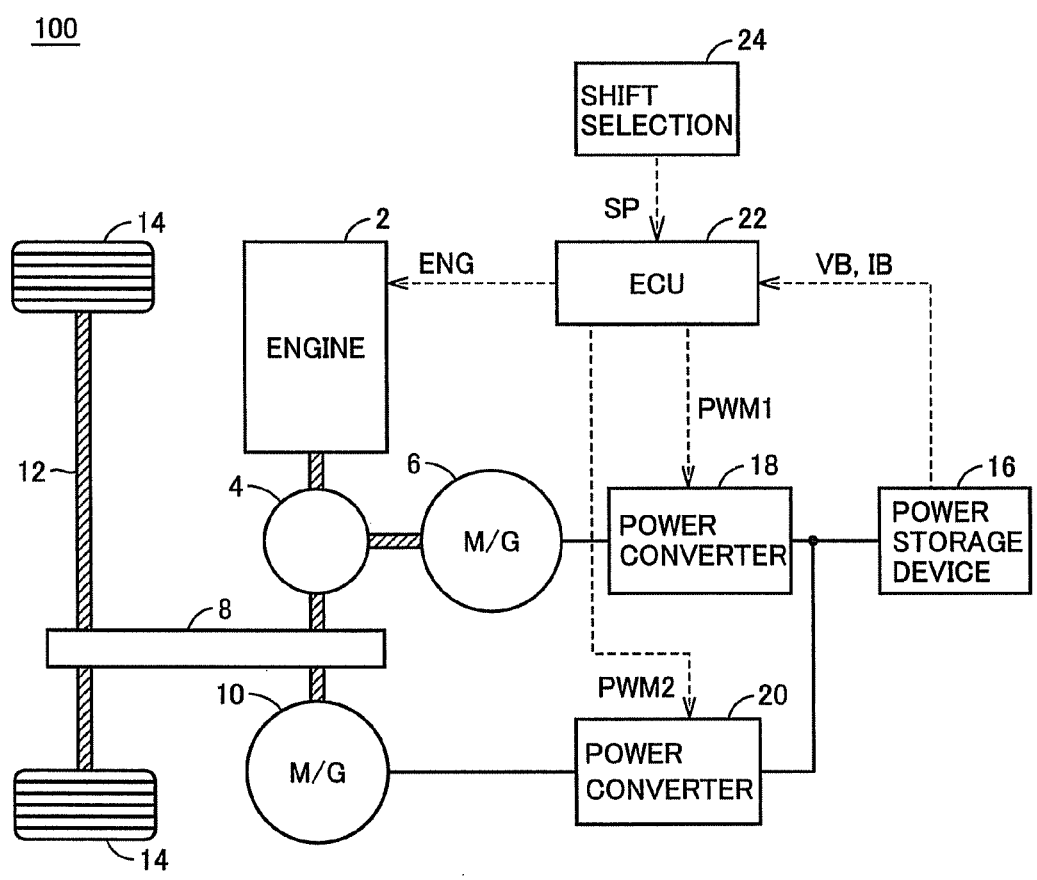
FIG. 1 is an overall block diagram of a hybrid vehicle according to a first embodiment of the present invention.

Referring to the drawings, embodiments of the present invention will be described below in detail. In the drawings, the same or corresponding portions are denoted by the same reference characters, and description thereof will not be repeated.

First Embodiment

FIG. 1 is an overall block diagram of a hybrid vehicle according to a first embodiment of the present invention. Referring to FIG. 1, a hybrid vehicle 100 includes an engine 2, a power split device 4, motor generators 6, 10, a transmission gear 8, a drive shaft 12, and wheels 14. Hybrid vehicle 100 further includes a power storage device 16, power converters 18, 20, an electronic control unit (hereinafter referred to as "ECU") 22, and a shift selection device 24.

Power split device 4 is coupled to engine 2, motor generator 6 and transmission gear 8 to distribute motive power among them. For example, a planetary gear having three rotation shafts of a sun gear, a planetary carrier and a ring gear can be used as power split device 4. These three rotation shafts are connected to the rotation shafts of motor generator 6, engine 2 and transmission gear 8, respectively. The rotation shaft of motor generator 10 is coupled to that of transmission gear 8. That is, motor generator 10 and transmission gear 8 share the same rotation shaft, which is connected to the ring gear of power split device 4.

Kinetic energy produced by engine 2 is distributed to motor generator 6 and transmission gear 8 by power split device 4. That is, engine 2 is incorporated into hybrid vehicle 100 as a power source that drives transmission gear 8 transmitting motive power to drive shaft 12 and drives motor generator 6. Motor generator 6 is incorporated into hybrid vehicle 100 to operate as a generator driven by engine 2 and as a motor capable of starting engine 2. Motor generator 10 is incorporated into hybrid vehicle 100 to operate as a power source that drives transmission gear 8 transmitting motive power to drive shaft 12.

Power storage device 16 is a rechargeable DC power source, and is implemented by, for example, a nickel-metal hydride, lithium ion or similar secondary battery. Power storage device 16 supplies electric power to power converters 18 and 20. Power storage device 16 is charged with electric power received from power converter 18 and/or power converter 20 during power generation of motor generator 6 and/or motor generator 10. A large-capacitance capacitor may be employed as power storage device 16. Any electric power buffer may be used that can temporarily store electric power generated by motor generators 6 and 10 and supply the stored electric power to motor generators 6 and 10. A voltage VB at power storage device 16 and a current IB flowing in/out of power storage device 16 are detected by sensors not shown, and their detected values are output to ECU 22.

Based on a signal PWM1 from ECU 22, power converter 18 converts electric power generated by motor generator 6 into DC power for output to power storage device 16. Based on a signal PWM2 from ECU 22, power converter 20 converts DC power supplied from power storage device 16 into AC power for output to motor generator 10. At the time of starting engine 2, power converter 18, based on signal PWM1, converts DC power supplied from power storage device 16 into AC power for output to motor generator 6. During braking of the vehicle or reduction in the acceleration on a down slope, power converter 20, based on signal PWM2, converts electric power generated by motor generator 10 into DC power for output to power storage device 16. It is noted that power converters 18 and 20 are each implemented by an inverter including three-phase switching elements, for example.

Motor generators 6 and 10 are AC motors, and are each implemented by, for example, a three-phase synchronous motor with permanent magnets embedded in a rotor. Motor generator 6 converts kinetic energy produced by engine 2 into electric energy for output to power converter 18. Motor generator 6 generates driving force by three-phase AC power received from power converter 18 to start engine 2.

Motor generator 10 generates driving torque for the vehicle by three-phase AC power received from power converter 20. During braking of the vehicle or reduction in the acceleration on a down slope, motor generator 10 converts mechanical energy stored in the vehicle as kinetic energy or potential energy into electric energy for output to power converter 20.

Engine 2 converts thermal energy produced by fuel combustion into kinetic energy for a movable member such as a piston or a rotor, and outputs the converted kinetic energy to power split device 4. For example, assuming that the movable member is a piston and is making a reciprocating motion, the reciprocating motion is converted into a rotational motion through a so-called crank mechanism, and the kinetic energy of the piston is transmitted to power split device 4.

Shift selection device 24 is a device that allows a driver to select one of a plurality of shift ranges. Shift selection device 24 includes a shift lever (not shown) which is movable to a P (parking) position, an R (reverse) position, an N (neutral) position, a D (drive) position, and the like. By placing the shift lever at the P, R, N, or D position, the P, R, N, or D range can be selected accordingly. Shift selection device 24 outputs a shift signal SP indicative of the selected shift range to ECU 22.

It is noted that the D and R ranges are ranges that allow immediate running by depression of the accelerator pedal, and will be generically called a "running range." On the other hand, the P and N ranges are ranges that do not allow running even by depression of the accelerator pedal, and will be generically called a "non-running range."

ECU 22 controls power converters 18, 20 and engine 2 by software processing by CPU (Central Processing Unit) executing a program stored previously and/or hardware processing by a dedicated electronic circuit. Specifically, ECU 22 generates signals PWM1 and PWM2 for driving power converters 18 and 20, respectively, and outputs generated signals PWM1 and PWM2 to power converters 18 and 20, respectively. ECU 22 also generates a signal ENG for controlling engine 2, and outputs generated signal ENG to engine 2. Furthermore, ECU 22 calculates SOC of power storage device 16 based on detected values of voltage VB and current IB at power storage device 16, and controls SOC of power storage device 16 based on the calculated value.

ECU 22 then controls start and stop of engine 2 based on the start condition and the stop condition for engine 2 set based on SOC. Here, ECU 22 receives shift signal SP from shift selection device 24, and in the case where the running range (e.g., the D range) has been selected when the vehicle stops, sets the stop condition for engine 2 such that the operation duration of engine 2 is shorter than during vehicle running. In the case where the non-running range (e.g., the P range) has been selected, ECU 22 sets the stop condition for engine 2 such that the operation duration of engine 2 is longer than in the case where the running range has been selected when the vehicle stops.

Figure 2:
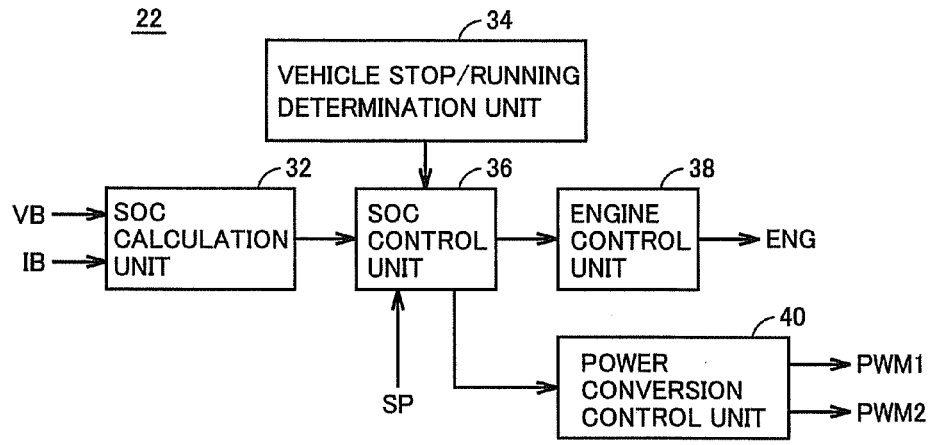
FIG. 2 is a functional block diagram of ECU.

FIG. 2 is a functional block diagram of ECU 22. Referring to FIG. 2, ECU 22 includes an SOC calculation unit 32, a vehicle stop/running determination unit 34, an SOC control unit 36, an engine control unit 38, and a power conversion control unit 40.

SOC calculation unit 32 calculates the SOC of power storage device 16 based on the respective detected values of voltage VB and current IB at power storage device 16, and outputs the result of calculation to SOC control unit 36. It is noted that calculation of the SOC can be performed with any of various publicly-known techniques.

Vehicle stop/running determination unit 34 determines whether the vehicle is in a vehicle stop state or in a running state, and outputs the result of determination to SOC control unit 36. It is noted that "a vehicle stop" here refers to the state where the vehicle is at a stop by pressing down of a brake pedal, not a shutdown of the vehicle system. It is noted that vehicle stop/running determination unit 34 determines a vehicle stop/running in accordance with, for example, vehicle speed, accelerator pedal/brake pedal press-down degree, shift range selected by shift selection device 24, and the like.

SOC control unit 36 controls SOC of power storage device 16. Specifically, if SOC falls below a threshold value L and when engine 2 is at a stop, SOC control unit 36 outputs a start instruction for engine 2 to engine control unit 38 and power conversion control unit 40. SOC control unit 36 then outputs a power generation instruction for motor generator 6 to power conversion control unit 40. If SOC exceeds a threshold value U1 (L<U1), SOC control unit 36 outputs a stop instruction for engine 2 to engine control unit 38.

Here, SOC control unit 36 receives shift signal SP from shift selection device 24, and when the vehicle is at a stop and in the case where the running range (e.g., the D range) has been selected, outputs the stop instruction for engine 2 to engine control unit 38 and sets the vehicle operation mode at an economy running mode, if SOC exceeds a threshold value U2 which is smaller than threshold value U1 (L<U2<U1). It is noted that the economy running mode is a mode in which engine 2 is stopped during a vehicle stop and is started as the vehicle starts running. That is, in the case where the running range has been selected when the vehicle stops, SOC control unit 36 causes engine 2 to stop if SOC exceeds threshold value U2. If running is started afterward, SOC control unit 36 outputs the start instruction for engine 2 to engine control unit 38 and power conversion control unit 40, and outputs the power generation instruction for motor generator 6 to power conversion control unit 40. It is noted that, while the vehicle is running, SOC control unit 36 does not output the stop instruction for engine 2 to engine control unit 38 until SOC exceeds threshold value U1.

In the case where the non-running range (e.g., the P range) has been selected, SOC control unit 36 outputs the stop instruction for engine 2 to engine control unit 38 if SOC exceeds a threshold value which is larger than threshold value U2. Here, if SOC exceeds threshold value U1 (U2<U1), SOC control unit 36 outputs the stop instruction for engine 2 to engine control unit 38.

Engine control unit 38 generates signal ENG for controlling engine 2, and outputs generated signal ENG to engine 2. Upon receipt of the start instruction for engine 2 from SOC control unit 36, engine control unit 38 generates signal ENG for instructing operation of engine 2, and outputs the signal to engine 2. Upon receipt of the stop instruction for engine 2 from SOC control unit 36, engine control unit 38 generates signal ENG for instructing stop of engine 2, and outputs the signal to engine 2.

Power conversion control unit 40 generates signals PWM1 and PWM2 for driving power converters 18 and 20, respectively, and outputs generated signals PWM1 and PWM2 to power converters 18 and 20, respectively. Upon receipt of the start instruction for engine 2 from SOC control unit 36, power conversion control unit 40 generates signal PWM1 for power running of motor generator 6, and outputs the signal to power converter 18. Upon receipt of the power generation instruction for motor generator 6 from SOC control unit 36, power conversion control unit 40 generates signal PWM1 for regeneration driving of motor generator 6, and outputs the signal to power converter 18. While the vehicle is running, power conversion control unit 40 generates signal PWM2 for driving motor generator 10, and outputs the signal to power converter 20.

In this ECU 22, if SOC falls below threshold value L (engine start condition) and when engine 2 is at a stop, control for starting engine 2 is performed. If SOC exceeds threshold value U1 (L<U1) (engine stop condition), control for stopping engine 2 is performed. Here, when the vehicle is at a stop and in the case where the running range has been selected by shift selection device 24, control for stopping engine 2 is performed if SOC exceeds threshold value U2 which is smaller than threshold value U1 (L<U2<U1). That is, in the case where the running range has been selected when the vehicle stops, the stop condition for engine 2 is changed such that the operation duration of engine 2 is shorter than during vehicle running.

On the other hand, in the case where the non-running range has been selected by shift selection device 24, control for stopping engine 2 is performed if SOC exceeds threshold value U1 which is larger than threshold value U2. That is, in the case where the non-running range has been selected, the stop condition for engine 2 is changed such that the operation duration of engine 2 is longer than in the case where the running range has been selected when the vehicle stops. In other words, in the case where the running range has been selected when the vehicle stops, the stop condition for engine 2 is changed such that the operation duration of engine 2 is shorter than during vehicle running, while in the case where the non-running range has been selected, the change to the stop condition is stopped.

Figure 3:
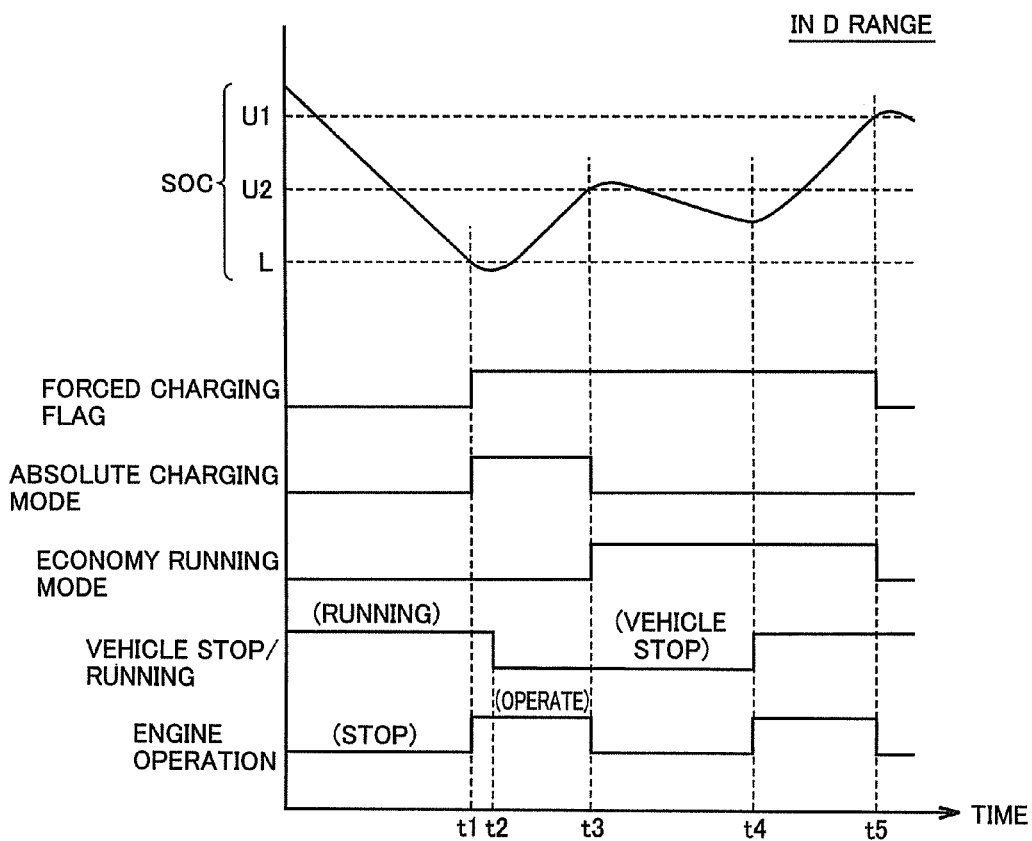
FIG. 3 illustrates an example of time changes in SOC of a power storage device in the case where a running range has been selected when the vehicle stops.

FIG. 3 illustrates an example of time changes in SOC of power storage device 16 in the case where the running range has been selected when the vehicle stops. It is noted that FIG. 3 representatively illustrates the case in which the D range has been selected. Referring to FIG. 3, before time t1, the vehicle shall be running by motor generator 10 with engine 2 stopped. When SOC decreases by running and falls below threshold value L at time t1, a forced charging flag is turned on. This forced charging flag remains on until SOC is recovered to threshold value U1 (L<U1). The vehicle operation mode is set at an "absolute charging mode." The absolute charging mode is a mode in which charging of power storage device 16 is carried out whether the vehicle is at a stop or running. Engine 2 is then started, and SOC starts increasing.

The vehicle shall be stopped at time t2. The D range shall remain selected after the vehicle stop. In the absolute charging mode, even during a vehicle stop, engine 2 is operated giving priority to recovery of SOC. Then, when SOC reaches threshold value U2 (L<U2<U1) at time t3, the vehicle operation mode changes to the "economy running mode." The economy running mode is a mode in which engine 2 is stopped during a vehicle stop, and is started as the vehicle starts running, as described above. Here, since the vehicle is at a stop, engine 2 is stopped. In this way, in the case where the D range has been selected when the vehicle stops, engine 2 is stopped at time t3 when SOC reaches threshold value U2 which is smaller than threshold value U1.

Then, at time t4, when a driver presses down the accelerator pedal to start running, engine 2 is started and SOC starts increasing. When SOC exceeds threshold value U1 (U2<U1), the forced charging flag is turned off, the economy running mode is terminated, and engine 2 is stopped.

Meanwhile, electric power is consumed by auxiliary machines, an electrically-powered air conditioner and the like during a vehicle stop, and SOC of power storage device 16 decreases unless charging of power storage device 16 is performed (time t3 to t4). Then, if SOC falls below threshold value L again, engine 2 is started. As described above, the engine stop threshold value during a vehicle stop is dropped from U1 to U2 so as to shorten the engine operating time. However, stop and operation of engine 2 may be accordingly repeated frequently if the vehicle stop time is long. Therefore, in this first embodiment, in the case where the non-running range in which the vehicle stop time is likely to be long has been selected, the engine stop threshold value is made higher than in the case where the running range has been selected when the vehicle stops. Stop and operation of engine 2 is thereby restrained from being repeated frequently. It is noted that, in this first embodiment, the engine stop threshold value is set at U1 in the case where the non-running range has been selected. That is, in the case where the non-running range has been selected, changing the engine stop threshold value from U1 to U2 is stopped to thereby achieve that the engine stop threshold value is made higher than in the case where the running range has been selected when the vehicle stops.

Figure 4:
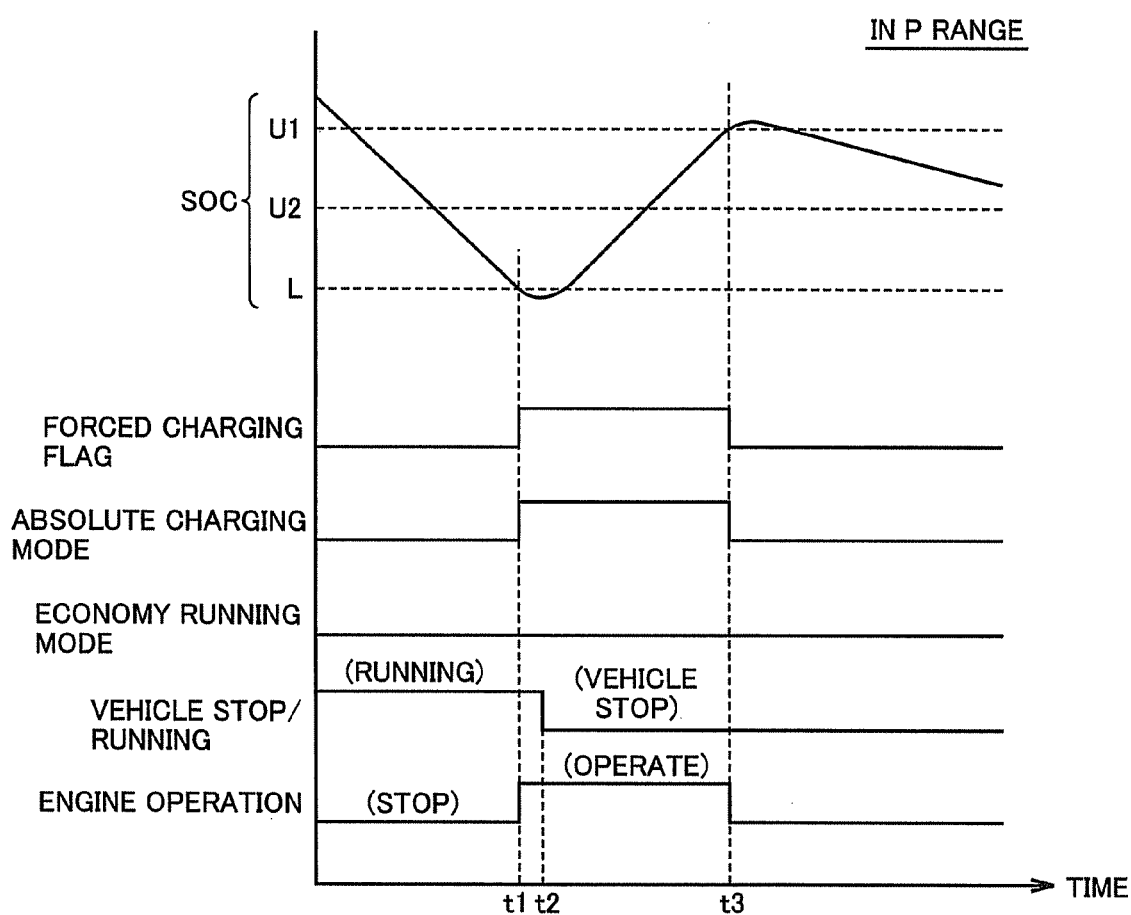
FIG. 4 illustrates an example of time changes in SOC of the power storage device in the case where a non-running range has been selected when the vehicle stops.

FIG. 4 illustrates an example of time changes in SOC of power storage device 16 in the case where the non-running range has been selected when the vehicle stops. It is noted that FIG. 4 representatively illustrates the case in which the P range has been selected. Referring to FIG. 4, the changes at and before time t2 are the same as those in FIG. 3. The vehicle shall be stopped at time t2, and then the P range shall be selected. Then, engine 2 is operated until SOC reaches threshold value U1. At time t3, SOC is recovered to threshold value U1 (>U2), and engine 2 is stopped. Accordingly, in the case where the vehicle remains at a stop after time t3, the time until SOC falls below threshold value L again due to electric power consumption by auxiliary machines, an electrically-powered air conditioner and the like is long. Stop and operation of engine 2 is thereby restrained from being repeated frequently.

Figure 5:
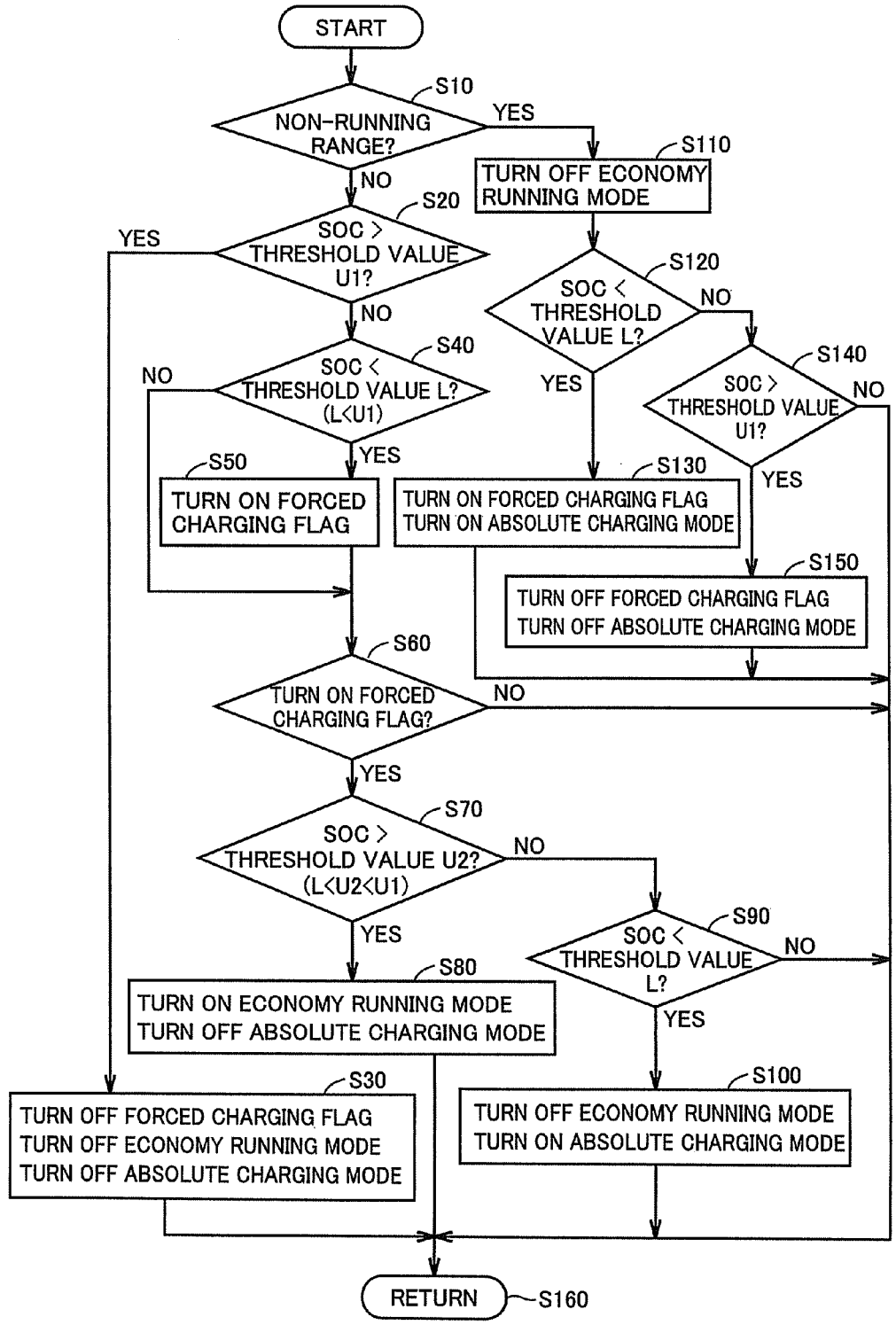
FIG. 5 is a flowchart for illustrating the procedure of SOC control executed by ECU.

FIG. 5 is a flowchart for illustrating the procedure of SOC control executed by ECU 22. The process shown in this flow chart is invoked from a main routine and executed at regular time intervals or when predetermined conditions are met.

Referring to FIG. 5, ECU 22 determines whether or not the non-running range has been selected based on shift signal SP from shift selection device 24 (step S10). If it is determined that the non-running range has not been selected, that is, if it is determined that the running range has been selected (NO in step S10), ECU 22 calculates SOC based on voltage VB and current IB of power storage device 16, and determines whether or not the calculated SOC is higher than threshold value U1 (step S20). If it is determined that SOC is higher than threshold value U1 (YES in step S20), ECU 22 turns off the forced charging flag, and also turns off the economy running mode and the absolute charging mode (step S30). Accordingly, if engine 2 is operating at this time, engine 2 is stopped.

If it is determined that SOC is less than or equal to threshold value U1 in step S20 (NO in step S20), ECU 22 determines whether or not SOC is lower than threshold value L (L<U1) (step S40). If it is determined that SOC is lower than threshold value L (YES in step S40), ECU 22 turns on the forced charging flag (step S50). It is noted that if it is determined that SOC is more than or equal to threshold value L (NO in step S40), ECU 22 advances the process to step S60.

Then, ECU 22 determines whether or not the forced charging flag has been turned on (step S60). If the forced charging flag is off (NO in step S60), ECU 22 advances the process to step S160 without executing subsequent processing.

If it is determined that the forced charging flag has been turned on in step S60 (YES in step S60), ECU 22 determines whether or not SOC is higher than threshold value U2 (L<U2<U1) (step S70). If it is determined that SOC is higher than threshold value U2 (YES in step S70), ECU 22 turns on the economy running mode and turns off the absolute charging mode (step S80). Accordingly, if the vehicle is at a stop at this time, engine 2 is stopped.

If it is determined that SOC is less than or equal to threshold value U2 in step S70 (NO in step S70), ECU 22 determines whether or not SOC is lower than threshold value L (step S90). If it is determined that SOC is lower than threshold value L (YES in step S90), ECU 22 turns on the absolute charging mode and turns off the economy running mode (step S100). Accordingly, if engine 2 is at a stop at this time whether the vehicle is at a stop or running, engine 2 is started. It is noted that if it is determined that SOC is more than or equal to threshold value L in step S90 (NO in step S90), ECU 22 advances the process to step S160.

On the other hand, if it is determined that the non-running range has been selected in step S10 (YES in step S10), ECU 22 turns off the economy running mode (step S110). Then, ECU 22 determines whether or not SOC is lower than threshold value L (step S120). If it is determined that SOC is lower than threshold value L (YES in step S120), ECU 22 turns on the forced charging flag, and also turns on the absolute charging mode (step S130). Accordingly, if engine 2 is at a stop at this time, engine 2 is started.

If it is determined that SOC is more than or equal to threshold value L in step S120 (NO in step S120), ECU 22 determines whether or not SOC is higher than threshold value U1 (step S140). If it is determined that SOC is higher than threshold value U1 (YES in step S140), ECU 22 turns off the forced charging flag, and also turns off the absolute charging mode (step S150). Accordingly, if engine 2 is operating at this time, engine 2 is stopped. It is noted that, if it is determined that SOC is lower than or equal to threshold value U1 in step S140 (NO in step S140), ECU 22 advances the process to step S160

It is noted that, in this flowchart, processing in steps S70 and S80 corresponds to "in the case where the running range has been selected when the vehicle stops, setting the start condition and the stop condition for the internal combustion engine such that an operation duration of the internal combustion engine is shorter than during vehicle running." Processing in steps S140 and S150 corresponds to "in the case where the non-running range has been selected, setting the stop condition for the internal combustion engine such that the operation duration of the internal combustion engine is longer than in the case where the running range has been selected when the vehicle stops."

As described above, in this first embodiment, in the case where the running range has been selected when the vehicle stops, the vehicle operation mode changes to the economy running mode, and engine 2 is stopped, if SOC exceeds threshold value U2 which is smaller than threshold value U1. Accordingly, engine 2 can be restrained from operating during a vehicle stop while achieving recovery of SOC if SOC decreases. In the case where the non-running range has been selected, operation of engine 2 is continued until SOC exceeds threshold value U1 which is larger than threshold value U2, and when SOC exceeds threshold value U1, engine 2 is stopped. Frequent stop and operation of engine 2 can thereby be restrained when the non-running range in which the time until running is started is likely to be longer has been selected. Therefore, according to this first embodiment, user's discomfort caused by operation of engine 2 during a vehicle stop can be relieved while achieving recovery of SOC.

Second Embodiment

SOC control similar to that of the first embodiment can be achieved by the procedure shown in the flowchart as will be described below, instead of the flowchart shown in FIG. 5.

The overall configuration of a hybrid vehicle according to this second embodiment is the same as that of hybrid vehicle 100 shown in FIG. 1.

Figure 6:
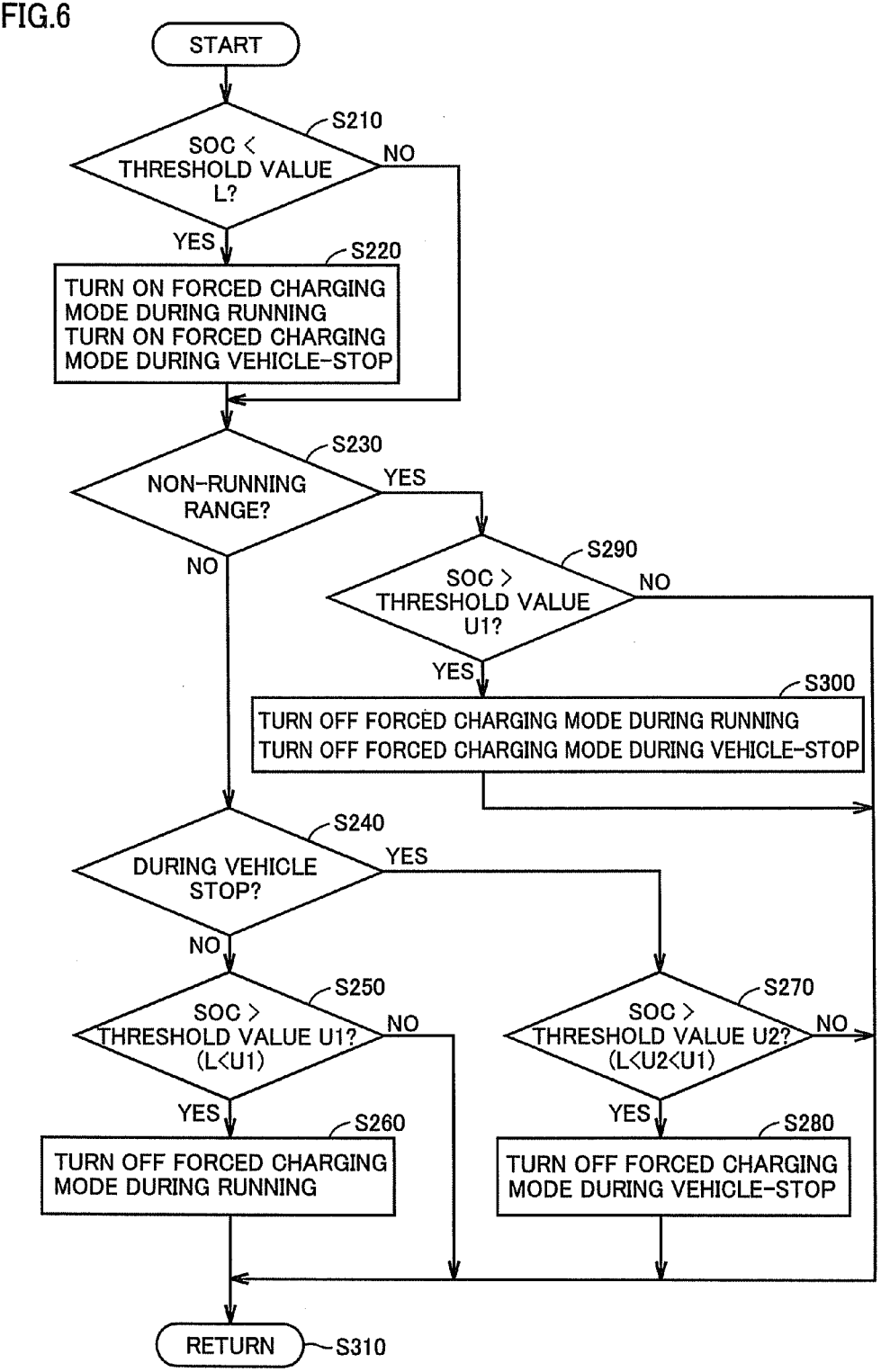
FIG. 6 is a flowchart for illustrating the procedure of SOC control in a second embodiment.

FIG. 6 is a flowchart for illustrating the procedure of SOC control in the second embodiment. It is noted that the process in this flow chart is also invoked from a main routine and executed at regular time intervals or when predetermined conditions are met.

Referring to FIG. 6, ECU 22 determines whether or not SOC calculated based on voltage VB and current IB of power storage device 16 is lower than threshold value L (step S210). If it is determined that SOC is lower than threshold value L (YES in step S210), ECU 22 turns on a forced charging mode during running and a forced charging mode during vehicle-stop (step S220). Here, the forced charging mode during running is a mode in which engine 2 is operated while the vehicle is running to charge power storage device 16. The forced charging mode during vehicle-stop is a mode in which engine 2 is operated during a vehicle stop to charge power storage device 16. Therefore, in this step S220, charging of power storage device 16 is started whether the vehicle is at a stop or running. It is noted that if it is determined that SOC is more than or equal to threshold value L (NO in step S210), ECU 22 advances the process to step S230.

Then, ECU 22 determines whether or not the non-running range has been selected based on shift signal SP from shift selection device 24 (step S230). If it is determined that the non-running range has not been selected, that is, if it is determined that the running range has been selected (NO in step S230), ECU 22 determines whether or not the vehicle is at a stop (step S240).

If it is determined that the vehicle is not at a stop, that is, running (NO in step S240), ECU 22 determines whether or not SOC is higher than threshold value U1 (L<U1) (step S250). If it is determined that SOC is higher than threshold value U1 (YES in step S250), ECU 22 turns off the forced charging mode during running (step S260). Accordingly, engine 2 is stopped, and charging of power storage device 16 is stopped. It is noted that if it is determined that SOC is less than or equal to threshold value U1 in step S250 (NO in step S250), ECU 22 advances the process to step S310.

On the other hand, if it is determined that the vehicle is at a stop in step S240 (YES in step S240), ECU 22 determines whether or not SOC is higher than threshold value U2 (L<U2<U1) (step S270). If it is determined that SOC is higher than threshold value U2 (YES in step S270), ECU 22 turns off the forced charging mode during vehicle-stop (step S280). Accordingly, engine 2 is stopped, and charging of power storage device 16 is stopped. It is noted that if it is determined that SOC is less than or equal to threshold value U2 in step S270 (NO in step S270), ECU 22 advances the process to step S310.

On the other hand, if it is determined in step S230 that the non-running range has been selected (YES in step S230), ECU 22 determines whether or not SOC is higher than threshold value U1 (step S290). If it is determined that SOC is higher than threshold value U1 (YES in step S290), ECU 22 turns off the forced charging mode during running and the forced charging mode during vehicle-stop (step S300). Accordingly, if engine 2 is operating at this time, engine 2 is stopped. It is noted that, if it is determined in step S290 that SOC is lower than or equal to threshold value U1 (NO in step S290), ECU 22 advances the process to step S310.

It is noted that, in this flowchart, the processing in steps S270 and S280 corresponds to "in the case where the running range has been selected when the vehicle stops, setting the start condition and the stop condition for the internal combustion engine such that an operation duration of the internal combustion engine is shorter than during vehicle running." Processing in steps S290 and S300 corresponds to "in the case where the non-running range has been selected, setting the stop condition for the internal combustion engine such that the operation duration of the internal combustion engine is longer than in the case where the running range has been selected when the vehicle stops."

As described above, the second embodiment can achieve functions similar to those of the first embodiment, and effects similar to those of the first embodiment are obtained.

Third Embodiment

In the above-described first and second embodiments, the threshold value of SOC at which engine 2 started due to decrease in SOC is stopped differs depending on running/stop and shift range. In this third embodiment, the threshold value of SOC at which engine 2 is started also differs between vehicle running and vehicle stop. Specifically, while the vehicle is at a stop, the threshold value of SOC at which engine 2 is started is set at a value which is smaller than while the vehicle is running. Accordingly, operation of engine 2 during a vehicle stop can further be restrained.

The overall configuration of a hybrid vehicle according to this third embodiment is the same as that of hybrid vehicle 100 shown in FIG. 1.

Figure 7:
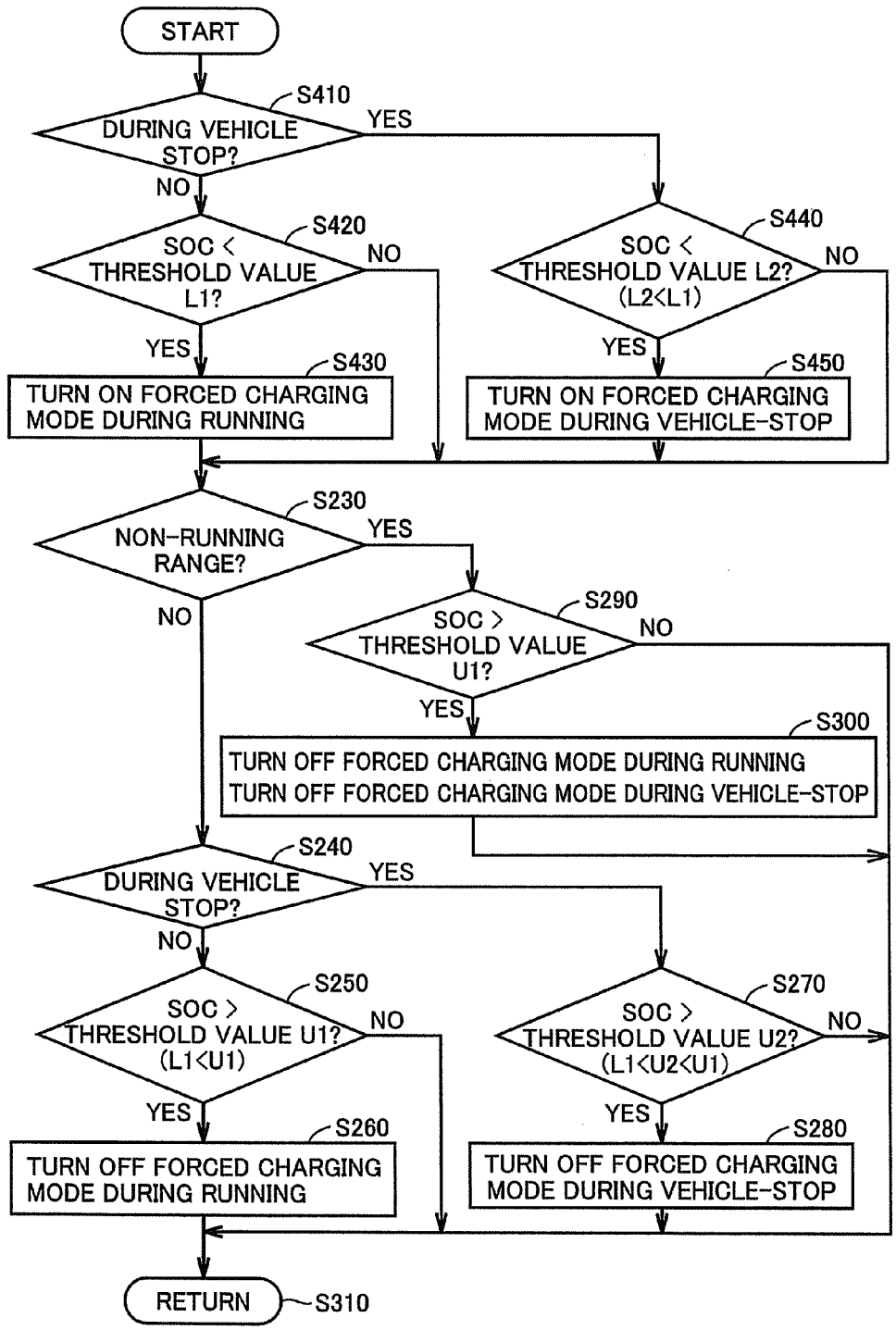
FIG. 7 is a flowchart for illustrating the procedure of SOC control in a third embodiment.

FIG. 7 is a flowchart for illustrating the procedure of SOC control in the third embodiment. The process in this flow chart is also invoked from a main routine and executed at regular time intervals or when predetermined conditions are met.

Referring to FIG. 7, this flow chart includes steps S410 to S450 instead of steps S210 and S220 in the flow chart shown in FIG. 6. That is, ECU 22 determines whether or not the vehicle is at a stop (step S410). If it is determined that the vehicle is not at a stop, that is, running (NO in step S410), ECU 22 determines whether or not SOC is lower than a threshold value L1 (step S420).

If it is determined that SOC is lower than threshold value L1 in step S420 (YES in step S420), ECU 22 turns on the forced charging mode during running (step S430).

Accordingly, engine 2 is started, so that power storage device 16 is charged. It is noted that if it is determined that SOC is more than or equal to threshold value L1 in step S420 (NO in step S420) ECU 22 advances the process to step S230.

On the other hand, if it is determined that the vehicle is at a stop in step S410 (YES in step S410), ECU 22 determines whether or not SOC is lower than a threshold value L2 (L2<L1) (step S440).

If it is determined that SOC is lower than threshold value L2 in step S440 (YES in step S440), ECU 22 turns on the forced charging mode during vehicle-stop (step S450). Accordingly, engine 2 is started, so that power storage device 16 is charged. It is noted that if it is determined that SOC is more than or equal to threshold value L2 in step S440 (NO in step S440), ECU 22 advances the process to step S230.

It is noted that the processing in step S230 and subsequent steps is the same as that of the flowchart shown in FIG. 6, and description thereof will not be repeated.

As described above, in this third embodiment, if the vehicle is running and if SOC falls below threshold value L1, engine 2 is started to charge power storage device 16. On the other hand, if the vehicle is at a stop and if SOC falls below threshold value L2 (L2<L1) which is smaller than threshold value L1, engine 2 is started to charge power storage device 16. Therefore, according to this third embodiment, operation of engine 2 during a vehicle stop can further be restrained.

It is noted that, in the above-described third embodiment, the stop condition for engine 2 shall also be changed (steps S230 to S280), however, the effect of restraining operation of engine 2 during a vehicle stop is obtained merely by changing the start condition for engine 2 (steps S410 to S450).

Although in each of the above-described embodiments, start and stop of engine 2 shall be controlled based on SOC of power storage device 16, another physical quantity relevant to the charged state of power storage device 16 may be used instead of SOC.

For example, start and stop of engine 2 may be controlled based on voltage VB of power storage device 16. Specifically, if voltage VB falls below a first threshold value corresponding to the start condition for engine 2, engine 2 is started. If voltage VB exceeds a second threshold value corresponding to the stop condition for engine 2, which is larger than the first threshold value, engine 2 is stopped. In the case where the running range has been selected when the vehicle stops, engine 2 may be stopped if voltage VB exceeds a third threshold value which is larger than the first threshold value and smaller than the second threshold value. In the case where the non-running range has been selected, engine 2 may be stopped if voltage VB exceeds a threshold value (e.g., the second threshold value) which is larger than the third threshold value. When the vehicle stops, the first threshold value may be changed to a value which is smaller than during vehicle running.

As the physical quantity relevant to the charged state of power storage device 16, the time elapsed from the start of charging of power storage device 16 may be used. Specifically, after engine 2 is started based on the start condition for engine 2, engine 2 is stopped when the elapsed time exceeds a threshold time corresponding to the stop condition for engine 2. In the case where the running range has been selected when the vehicle stops, the threshold time may be changed to a time which is shorter than during vehicle running. In the case where the non-running range has been selected, the threshold time may be a time which is longer than in the case where the running range has been selected when the vehicle stops (e.g., the threshold time during running).

While a series/parallel-type hybrid vehicle in which the motive power of engine 2 divided by power split device 4 can be transmitted to transmission gear 8 and motor generator 6 has been described above, the present invention is also applicable to other types of hybrid vehicles. Specifically, the present invention is also applicable to, but not limited to, a series-type hybrid vehicle in which engine 2 is used solely to drive motor generator 6 and the driving force for the vehicle is produced solely by motor generator 10, a single motor-type hybrid vehicle mainly powered by the engine and assisted by a motor as necessary in which that motor can also be used as a power generator to charge a power storage device, and the like. The present invention is also applicable to a so-called plug-in hybrid vehicle in which power storage device 16 can be charged by a power supply outside the vehicle.

While it has been described above that the R range is included in the running range, the R range may be included in the non-running range in the case of a system in which the engine cannot be operated at the time of reverse running to charge the power storage device.

In the foregoing, engine 2 corresponds to an embodiment of "an internal combustion engine" according to the present invention. Motor generators 6 and 10 correspond to an embodiment of "at least one motor" according to the present invention. ECU 22 corresponds to an embodiment of "a control device" according to the present invention.

It should be construed that embodiments disclosed herein are by way of illustration in all respects, not by way of limitation. It is intended that the scope of the present invention is defined by claims, not by the description above, and includes all modifications and variations equivalent in meaning and scope to the claims.

REFERENCE SIGNS LIST 2 engine; 4 power split device; 6, 10 motor generator; 8 transmission gear; 12 driving shaft; 14 wheel; 16 power storage device; 18, 20 power converter; 22 ECU; 24 shift selection device; 32 SOC calculation unit; 34 vehicle stop/running determination unit; 36 SOC control unit; 38 engine control unit; 40 power conversion control unit; 100 hybrid vehicle.

The invention claimed is:

1. A hybrid vehicle comprising:
a power storage device;
an internal combustion engine;
at least one motor having an electric power generation function in which the motor is driven by said internal combustion engine to supply electric power to said power storage device and a function of producing running driving force;
a control device configured to control start and stop of said internal combustion engine based on a start condition and a stop condition for said internal combustion engine set from a physical quantity relevant to a charged state of said power storage device; and
a shift selection device for selection of one of a plurality of shift ranges included in one of a running range and a non-running range,
in the case where said running range has been selected when the vehicle stops, said control device setting said start condition and said stop condition such that an operation duration of said internal combustion engine is shorter than during vehicle running, and in the case where said non-running range has been selected, said control device setting said stop condition such that said operation duration is longer than in the case where said running range has been selected when the vehicle stops.

2. The hybrid vehicle according to claim 1, wherein
in the case where said running range has been selected when the vehicle stops, said control device makes a change in said stop condition such that said operation duration is shorter than during vehicle running, and
in the case where said non-running range has been selected, said control device stops the change in said stop condition.

3. The hybrid vehicle according to claim 1, wherein
said physical quantity is a remaining capacity of said power storage device,
said control device causes said internal combustion engine to start if said remaining capacity falls below a first threshold value corresponding to said start condition,
in the case where said running range has been selected when the vehicle stops, said control device causes said internal combustion engine to stop if said remaining capacity exceeds a second threshold value corresponding to said stop condition, which is larger than said first threshold value, and
in the case where said non-running range has been selected, said control device causes said internal combustion engine to stop if said remaining capacity exceeds a third threshold value which is larger than said second threshold value.

4. The hybrid vehicle according to claim 3, wherein
in the case where said running range has been selected when the vehicle stops, said control device sets a vehicle operation mode at an economy running mode in which said internal combustion engine is stopped during a vehicle stop and is started as the vehicle starts running, if said remaining capacity exceeds said second threshold value, and
in the case where said non-running range has been selected, said control device cancels setting of said economy running mode.

5. The hybrid vehicle according to claim 1, wherein
said physical quantity is a voltage of said power storage device,
said control device causes said internal combustion engine to start if said voltage falls below a first threshold value corresponding to said start condition,
in the case where said running range has been selected when the vehicle stops, said control device causes said internal combustion engine to stop if said voltage exceeds a second threshold value corresponding to said stop condition, which is larger than said first threshold value, and
in the case where said non-running range has been selected, said control device causes said internal combustion engine to stop if said voltage exceeds a third threshold value which is larger than said second threshold value.

6. The hybrid vehicle according to claim 1, wherein
said physical quantity includes an elapsed time from the start of charging of said power storage device, and
after said internal combustion engine is started based on said start condition, in the case where said running range has been selected when the vehicle stops, said control device causes said internal combustion engine to stop if said elapsed time exceeds a first threshold time corresponding to said stop condition, and in the case where said non-running range has been selected, said control device causes said internal combustion engine to stop if said elapsed time exceeds a second threshold time which is longer than said first threshold time.

7. A method for controlling a hybrid vehicle,
said hybrid vehicle including
a power storage device,
an internal combustion engine,
at least one motor having an electric power generation function in which the motor is driven by said internal combustion engine to supply electric power to said power storage device and a function of producing running driving force, and
a shift selection device for selection of one of a plurality of shift ranges included in one of a running range and a non-running range,
said method comprising the steps of:
controlling start and stop of said internal combustion engine based on a start condition and a stop condition for said internal combustion engine set from a physical quantity relevant to a charged state of said power storage device;
in the case where said running range has been selected when the vehicle stops, setting said start condition and said stop condition such that an operation duration of said internal combustion engine is shorter than during vehicle running; and
in the case where said non-running range has been selected, setting said stop condition such that said operation duration is longer than in the case where said running range has been selected when the vehicle stops.

8. The method for controlling a hybrid vehicle according to claim 7, wherein
the step of setting said start condition and said stop condition includes the step of, in the case where said running range has been selected when the vehicle stops, making a change in said stop condition such that said operation duration is shorter than during vehicle running, and
the step of setting said stop condition such that said operation duration is longer includes the step of, in the case where said non-running range has been selected, stopping the change in said stop condition.

9. The method for controlling a hybrid vehicle according to claim 7, wherein
said physical quantity is a remaining capacity of said power storage device, and
the step of controlling start and stop of said internal combustion engine includes the steps of
starting said internal combustion engine if said remaining capacity falls below a first threshold value corresponding to said start condition,
in the case where said running range has been selected when the vehicle stops, stopping said internal combustion engine if said remaining capacity exceeds a second threshold value corresponding to said stop condition, which is larger than said first threshold value, and
in the case where said non-running range has been selected, stopping said internal combustion engine if said remaining capacity exceeds a third threshold value which is larger than said second threshold value.

10. The method for controlling a hybrid vehicle according to claim 9, further comprising the steps of:
in the case where said running range has been selected when the vehicle stops, setting a vehicle operation mode at an economy running mode in which said internal combustion engine is stopped during a vehicle stop and is started as the vehicle starts running, if said remaining capacity exceeds said second threshold value; and
in the case where said non-running range has been selected, canceling setting of said economy running mode.

* * * * *